United States Patent [19]

Iannazzi et al.

[11] Patent Number: 5,527,574

[45] Date of Patent: Jun. 18, 1996

[54] REINFORCED AIR BAG DOOR COVER AND METHOD FOR MAKING SAME

[75] Inventors: Peter J. Iannazzi, Hampton; Marie Hersman, Durham, both of N.H.

[73] Assignee: Davidson Textron Inc., Dover, N.H.

[21] Appl. No.: 413,965

[22] Filed: Mar. 30, 1995

Related U.S. Application Data

[62] Division of Ser. No. 161,566, Dec. 6, 1993, Pat. No. 5,429,784.

[51] Int. Cl.$^6$ ............................................. B60R 21/20
[52] U.S. Cl. ............................ 428/43; 428/76; 280/728.3
[58] Field of Search ............................ 428/31, 43, 76; 280/728 R

[56] References Cited

U.S. PATENT DOCUMENTS

| | | | |
|---|---|---|---|
| 2,335,371 | 11/1943 | Willis | 18/55 |
| 2,797,179 | 6/1957 | Reynolds et al. | 154/110 |
| 3,446,880 | 5/1969 | Enicks | 264/45 |
| 4,130,614 | 12/1978 | Saidla | 264/46.4 |
| 4,455,340 | 6/1984 | Okina | 428/215 |
| 4,562,025 | 12/1985 | Gray | 264/126 |
| 4,623,503 | 11/1986 | Anestis et al. | 264/302 |
| 4,664,864 | 5/1987 | Wersosky | 264/301 |
| 4,734,230 | 3/1988 | Rhodes, Jr. et al. | 264/46.4 |
| 4,910,067 | 3/1990 | O'Neill | 428/139 |
| 4,927,575 | 5/1990 | Brock et al. | 264/46.4 |
| 5,118,132 | 6/1992 | Nakajima | 280/728 |
| 5,149,479 | 9/1992 | Nakajima | 264/163 |
| 5,164,135 | 11/1992 | Parker et al. | 264/161 |
| 5,256,354 | 10/1993 | Chadwick | 264/119 |
| 5,288,103 | 2/1994 | Parker et al. | 280/728 |
| 5,344,183 | 9/1994 | Hersman et al. | 280/728 |

FOREIGN PATENT DOCUMENTS

| | | | |
|---|---|---|---|
| 4938020 | 10/1974 | Japan | 264/310 |
| 63-184548 | 7/1988 | Japan | B60R 21/20 |
| 2239435 | 7/1991 | United Kingdom | B60R 21/16 |

*Primary Examiner*—Alexander S. Thomas
*Attorney, Agent, or Firm*—Reising, Ethington, Barnard & Perry

[57] ABSTRACT

A method is disclosed for forming a reinforced plastic skin for an automobile interior trim structure. The method includes the steps of supplying a plastic material onto a mold surface, heating the plastic material to fuse it into a unitary layer, embedding a reinforcing material into the layer, and cooling the plastic and reinforcing materials. The method can be used to reinforce an air bag door cover by incorporating a tear seam into the plastic layer and embedding the reinforcing material into the layer such that it surrounds the tear seam. The reinforcing material aids in rupturing of the cover along the designated tear seam during deployment of the air bag. Also disclosed is an air bag door cover formed in accordance with the disclosed method.

4 Claims, 3 Drawing Sheets

REINFORCED AIR BAG DOOR COVER AND METHOD FOR MAKING SAME

This is a division of application Ser. No. 08/161,566, filed on Dec. 6, 1993, now U.S. Pat. No. 5,429,784.

BACKGROUND OF THE INVENTION

1. Technical Field

This invention relates to automotive interior trim structures incorporating a cover for an air bag deployment opening and, in particular, relates to an automobile interior trim structure having a decorative outer skin that includes a reinforced air bag door cover. Further, the invention relates to a method for making the reinforced outer skin.

2. Description of the Related Art

Various types of supplemental involuntary restraint systems (SIRs) are currently being provided by automobile manufacturers to help reduce the extent of personal injuries incurred in automobile accidents. Air bags are increasingly becoming one of the most common and popular SIRs utilized. Air bags are designed to inflate during a collision to restrain forward movement of the driver and/or other occupants to help avoid injurious contact with interior portions of the automobile.

Air bags are typically stowed behind one or more interior trim structures, such as the steering wheel cover, door panel, or passenger side portion of the instrument panel. These interior trim structures must, therefore, be specifically manufactured to permit deployment of the air bag upon a collision being detected. Such manufacturing entails consideration of a multitude of design requirements, such as the functional requirements of the air bag deployment system and the aesthetic requirements of the interior trim structures. Moreover, many of these requirements involve counter-vailing considerations. For example, the air bag should be able to be deployed virtually instantaneously upon a collision being detected. However, it should be stowed in such a manner as to 1) inhibit accidental or intentional tampering that would interfere with its performance and 2) contribute to an overall pleasing interior appearance. In regard to the latter consideration, it is, as a matter of human psychology, undesirable to remind the automobile occupants of the dangers of driving and the existence of the air bag is therefore preferably made entirely invisible.

Interior trim structures used in automotive applications typically comprise a composite article having a foam layer formed between a rigid insert and a decorative outer skin. The insert provides structural reinforcement to the interior trim structure and is used to secure the trim structure within the automobile interior. Because the reinforcing insert is rigid, it either has an opening through which the air bag is deployed or is manufactured with one or more hinges which define one or more doors that open upon the air bag being inflated. The portion of the decorative outer skin that overlies the air bag deployment opening is hereinafter referred to as the air bag door cover.

In the typical air bag deployment scheme, the air bag forces its way out of its stowed position upon expansion. Various arrangements of the interior trim structures have been suggested to accommodate deployment of the air bag in this manner. One such arrangement involves forming the air bag door cover as a unitary part of the outer skin of the interior trim structure and pre-weakening the air bag door cover on its inside (i.e., non-decorative) surface to form a tear seam along which the outer skin will separate under the force of expansion of the air bag.

The outer skin, and therefore the air bag door cover, is typically made from a vinyl material such as a polyvinyl chloride (PVC). At cold temperatures, this vinyl material becomes brittle, increasing the likelihood of cracking of the door cover along the tear seam as well as fragmentation of the door cover upon deployment of the air bag. Conversely, at elevated temperatures, the vinyl skin material has a significantly increased tensile elongation and is therefore more difficult to rupture. Moreover, such elongation during expansion of the air bag can cause separation of the outer skin from the intermediate foam layer, possibly resulting in pieces of foam becoming separated from the foam layer.

As mentioned above, the interior trim structure, of which the air bag door is made a part, typically comprises a foam layer formed between a rigid insert and an outer skin. The air bag deployment opening is covered by an air bag door which can have a structure corresponding to the remainder of the interior trim structure, i.e., the air bag door can comprise a foam layer formed between the outer skin and a hinged, rigid backside which provides reinforcement of the air bag door. Although the rigid backside can aid rupturing of the tear seam upon deployment of the air bag, it is not in direct contact with the air bag door cover in which the tear seam is formed. Rather, it must act through the relatively soft foam layer which decreases its ability to cause the air bag door cover to separate along its tear seam.

Reinforcing members have been used for various reasons in other applications. For example, U.S. Pat. No. 4,455,340, issued Jun. 19, 1984 to T. Okina, discloses a flexible molded foam article having an intermediate reinforcing layer located between a semi-rigid polyurethane foam core and surface layer. The intermediate reinforcing layer is formed from three-dimensional cross-linked polyurethane in the form of a thin elastic film. Additionally, woven fabrics or mats made from such materials as fiberglass have been used as reinforcing layers. U.S. Pat. No. 4,130,614, issued Dec. 19, 1978 to G. E. W. Saidla, discloses a structural foam article formed by pouring a polyurethane resin onto a fiber-reinforcing sheet that is placed over a facing sheet in a mold. The polyurethane resin foams through the fiber-reinforcing sheet and bonds to the facing sheet, resulting in a structural foam article having a polyurethane resin core bonded to a facing sheet with an intermediate layer formed from the fiber-reinforcing sheet and polyurethane resin.

SUMMARY OF THE INVENTION

In accordance with the present invention there is provided a method of forming a reinforced plastic skin for an automobile interior trim structure, comprising the steps of supplying a plastic material onto a mold surface defining the outer surface of the interior trim structure, heating the plastic material to fuse the plastic material into a unitary layer thereof, embedding a reinforcing material into the layer, and cooling the plastic material and the reinforcing material. The reinforcing material can be a woven mesh of, for example, fiberglass. The plastic is preferably a polyvinyl chloride. The woven fiberglass fabric can be embedded into the layer by pressing it into the backside (i.e., non-decorative side) of the plastic layer. Alternatively, the woven mesh can be embedded by placing it onto the layer, supplying an additional amount of the plastic material over it and the layer, and heating the plastic material to fuse the plastic material together, whereby a single layer of plastic material is formed having the woven mesh embedded therein.

The reinforcing material need not extend over the entire area of the outer skin. It can be located wherever reinforcement of the outer skin is desirable. Preferably, however, the reinforced outer skin is formed as a part of producing an air bag door cover that is unitary with the remainder of the outer skin of the interior trim structure. Accordingly, the method preferably further includes the steps of incorporating a tear seam into the layer, and embedding the woven mesh into the layer such that it surrounds the tear seam. That is, the woven mesh is located about the tear seam, but does not overlie it. Preferably, the woven mesh covers the air bag door cover and extends into the surrounding area of the outer skin.

In accordance with another aspect of the invention, a method is provided for forming a reinforced air bag door cover as a unitary part of an outer skin for an automobile interior trim structure. This method includes the steps of supplying a plastic material onto a mold surface, heating the plastic material to fuse the plastic material into a unitary layer thereof, defining a portion of the layer that corresponds to a tear seam for the air bag door cover, embedding a reinforcing material into the layer such that the reinforcing material surrounds the portion, and cooling the plastic material and the reinforcing material. The reinforcing material preferably comprises a woven mesh of fiberglass and the plastic material preferably comprises a polyvinyl chloride.

A gap having a shape that generally corresponds to the tear seam portion can be formed in the woven mesh prior to the embedding step. Alternatively, the woven mesh can be scored or otherwise separated along the tear seam portion after being placed onto the layer of plastic material. Moreover, the tear seam can be formed by scoring, engraving, embossing, or otherwise prior to embedding the woven mesh into the layer about the tear seam.

The reinforcing material is preferably embedded into the plastic layer in either of two ways. One way includes forming the layer of plastic material such that it has a first side in contact with the mold surface and a second side located opposite the first side and then pressing the reinforcing material into the second side of the layer. Preferably, a woven mesh having interstices therein is pressed into the plastic layer such that plastic material extends into the interstices. The result is a reinforcing layer that is securely embedded into the plastic outer skin.

A second way of embedding the reinforcing material includes placing the reinforcing material onto the layer, supplying an additional amount of the plastic material over the reinforcing material and the layer, and heating the plastic material to fuse the plastic material together, whereby a single layer of plastic material is formed having the reinforcing material embedded therein. Again, a woven mesh having interstices is preferably used such that the plastic fuses through the interstices during the heating step.

In accordance with yet another aspect of the present invention, there is provided an outer skin for an automobile interior trim structure having an air bag door cover incorporated therein. The outer skin comprises a layer of plastic material having a first surface defining an exposed decorative surface and a second surface having a tear seam therein that defines at least one air bag door cover. The outer skin includes a reinforcing material which is embedded in the layer below the first surface and which extends over the air bag door cover on either side of the tear seam. As in the other embodiments of the invention, the reinforcing material preferably comprises a woven mesh having interstices therein. Accordingly, the plastic material preferably extends into the interstices to securely embed the woven mesh into the plastic layer. The woven mesh or other reinforcing material can be embedded into the backside of the plastic layer or can be completely encased within the plastic layer.

The reinforcing material is located on either side of the tear seam and preferably covers the portion of the layer plastic that acts as the air bag door cover. Even more preferably, the reinforcing material extends into the area of the layer immediately surrounding the air bag door cover and tear seam. The reinforcing material located about the tear seam helps insure rapid, accurate separation of the air bag door cover along its designated tear seam upon deployment of the air bag. Moreover, the reinforcing material provides additional structural integrity to the air bag door that overlies the air bag deployment opening.

BRIEF DESCRIPTION OF THE DRAWINGS

The preferred exemplary embodiments of the present invention will hereinafter be described in conjunction with the appended drawings, wherein like designations denote like elements, and.

It should be understood that the various figures are for purposes of illustration only and are primarily diagrammatic rather than pictorial. They are not intended to represent scaled views of the structures that they depict.

DESCRIPTION OF THE PREFERRED EMBODIMENTS

Figure 1:
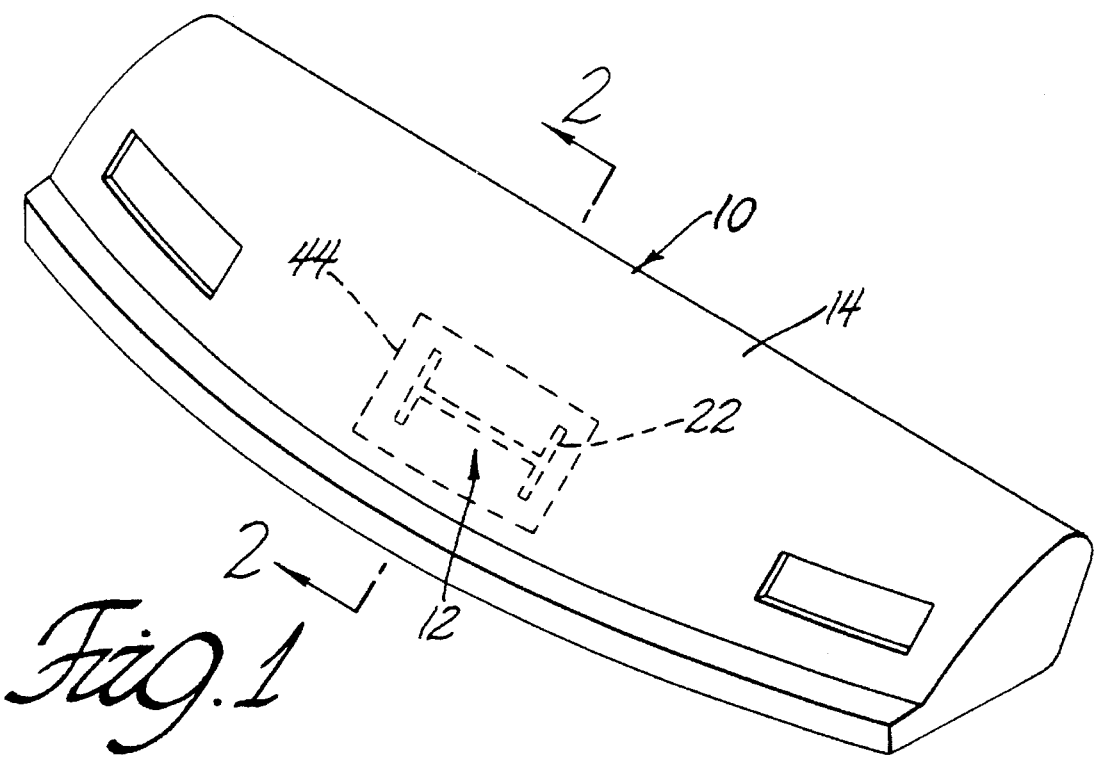
FIG. 1 is a perspective view of an interior trim structure having an outer skin of the present invention that includes a unitary air bag door cover.
Figure 2:
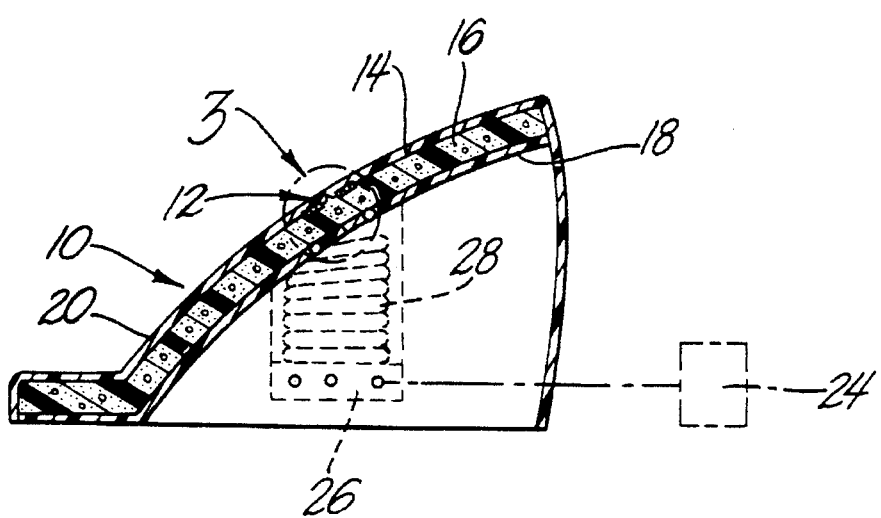
FIG. 2 is a cross-sectional view taken along the 2—2 line of FIG. 1 and showing a section of woven fiberglass mesh embedded in the outer skin in accordance with the invention.

FIGS. 1 and 2 depict an automobile interior trim structure and, in particular, a portion of a dashboard 10 that includes a pair of integral air bag doors 12. Dashboard 10 is formed from three layers—an outer skin 14, an intermediate foam layer 16, and a rigid insert 18. Outer skin 14 has an exterior surface 20 which is exposed to the automobile occupants when dashboard 10 is assembled as a component part of an automobile. As described below in greater detail, air bag doors 12 are defined by hinged portions of insert 18 and a tear seam 22 formed in the backside of outer skin 14. Upon a collision being detected by a sensor 24, a gas generator 26 inflates an air bag 28 which forces the hinged portions of insert 18 outwardly, thereby tearing foam layer 16 and outer skin 14 along tear seam 22.

Outer skin 14 and insert 18 are typically preformed and can thereafter be co-molded together by foam layer 16. Outer skin 14 can be a polyvinyl chloride, such as plastisol or drysol, or an acrylonitrile-butadiene-styrene (ABS) resin and the details of its construction will be described below in greater detail. Insert 18 can be preformed as described, for example, in U.S. Pat. No. 4,734,230, issued Mar. 29, 1988 to R. D. Rhodes, Jr. et al. The preformed outer skin 14 and insert 18 can then be placed on opposing inner surfaces of a mold and bonded together by the formation of foam layer 16 therebetween. Such a process is described in U.S. Pat. No. 4,743,188, issued May 10, 1988 to J. D. Gray et al. Other means of forming foam layer 16 and insert 18 and bonding them to outer skin 14 are known to those skilled in the art and can be suitably employed to produce dashboard 10.

Figure 3:
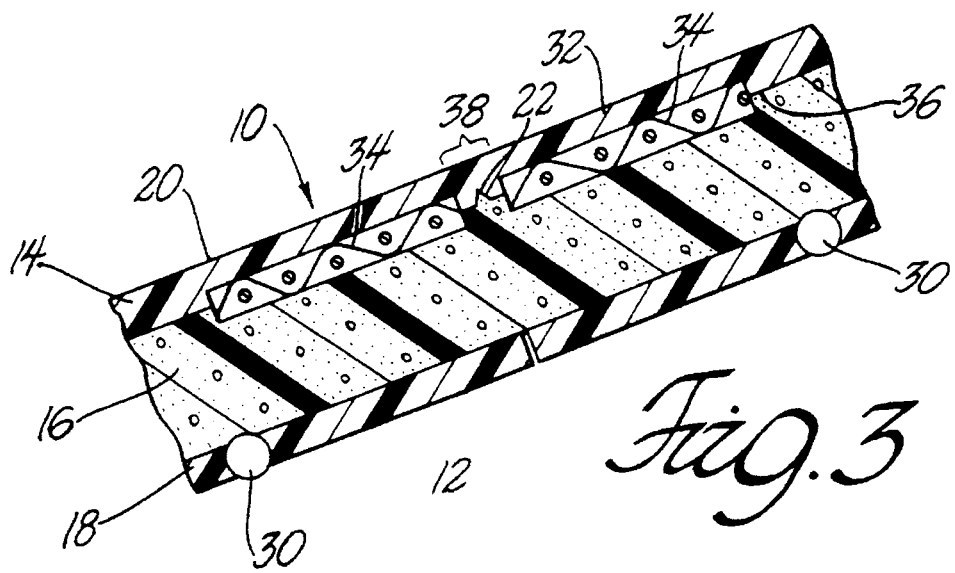
FIG. 3 is an enlarged view of a designated portion of the cross-section shown in FIG. 2.

Referring now to FIG. 3, dashboard 10 includes an air bag deployment opening defined by air bag doors 12 formed as a part of insert 18 and pivotable about a pair of hinges 30. The portion of outer skin 14 that includes tear seam 22 and that overlies doors 12 comprises an air bag door cover 32 for the air bag deployment opening. Cover 32 includes tear seam 22 which is defined by a reduction in thickness of cover 32.

In accordance with the present invention, cover 32 of outer skin 14 includes a woven fiberglass mesh 34 embedded in the backside 36 thereof. A gap 38 is provided in mesh 34 to accommodate tear seam 22. As will be understood by those skilled in the art, mesh 34 reinforces cover 32 and restricts elongation of cover 32 upon deployment of air bag 28. As a result, the likelihood of cover 32 becoming separated from foam layer 16 is reduced and, therefore, the likelihood of undesirable fragmentation of foam layer 16 is reduced. Also, less elongation of cover 32 should be accompanied by faster rupturing of tear seam 22. Moreover, the reinforcement provided by mesh 34 acts to insure that cover 32 separates along the designated tear seam, thereby helping to insure proper deployment of air bag 28.

Figure 4:
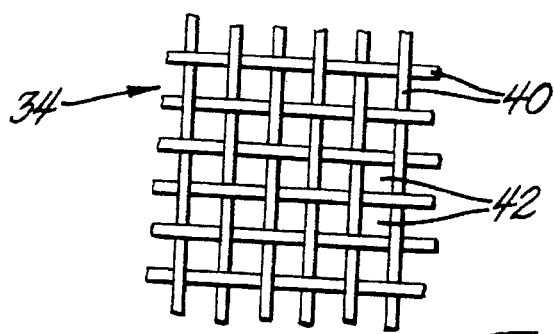
FIG. 4 is a fragmentary top view of a woven mesh suitable for use in the invention.

Although mesh 34 is shown extending beyond the surface of backside 36, it will be appreciated that mesh 34 can be flush with or slightly recessed into backside 32 without departing from the scope of the present invention. Referring now to FIG. 4, mesh 34 preferably has a weave of strands 40 that are spaced sufficiently to provide interstices 42 into which extends the material (e.g., PVC or ABS) that makes up outer skin 14. This arrangement helps bond mesh 34 to cover 32 and is believed to help restrict elongation of cover 32 upon expansion of air bag 28.

Mesh 34 preferably surrounds tear seam 22. That is, mesh 34 is preferably located about tear seam 22, but does not overlie it and therefore does not interfere with the separation of air bag doors 12 during deployment of air bag 28. In a highly preferred embodiment, mesh 34 is located throughout air bag door cover 32 and extends into the surrounding area of outer skin 14, as indicated by the dashed line 44 shown in FIG. 1.

Tear seam 22 is preferably formed in backside 36 of cover 32. As indicated in FIG. 1, tear seam 22 is therefore not visually observable by the automobile occupants. Other means of pre-weakening cover 32 to form a tear seam therein can of course be used without departing from the scope of the present invention. Moreover, it is believed that if the thickness of the portion of cover 32 bridging gap 38 is made sufficiently small, then the structural integrity provided by mesh 34 would be enough to separate cover 32 at gap 38 without the need for pre-weakening of cover 32. In the illustrated embodiment, tear seam 22 comprises an H-shaped portion of cover 32. It will of course be understood that tear seams utilizing other shapes (e.g., C, U, or X) can be selected and that a gap corresponding to the selected shape would be provided in mesh 34.

Figure 3A:
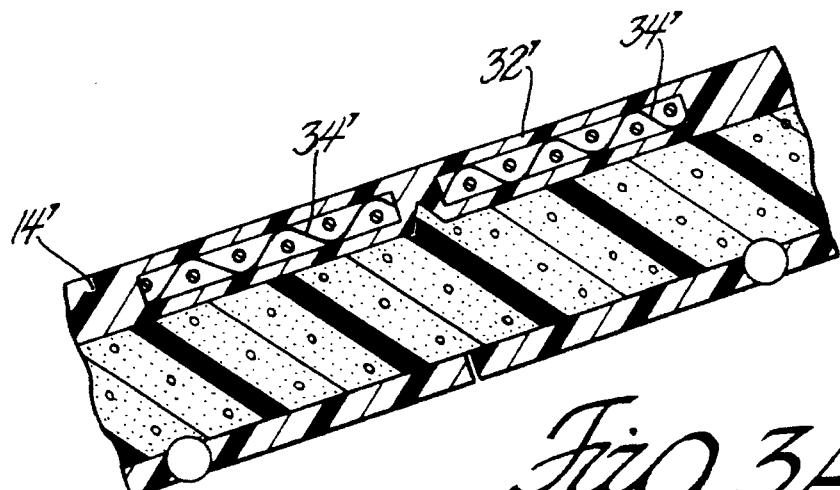
FIG. 3A is an enlarged view as in FIG. 3, but which shows an alternative arrangement for embedding the woven mesh into the outer skin.

Referring now to FIG. 3A, an alternative embodiment of dashboard 10 of FIG. 3 includes substantially the same construction as that shown in FIG. 3. However, this embodiment includes a woven mesh 34' that is completely embedded, i.e., encased, within a cover 32' that is a unitary part of an outer skin 14'. Preferably, woven mesh 34' has the same construction as that of mesh 34 (i.e., as shown in FIG. 4) so that the material that forms cover 32' is fused through the interstices in mesh 32'.

Figure 5:
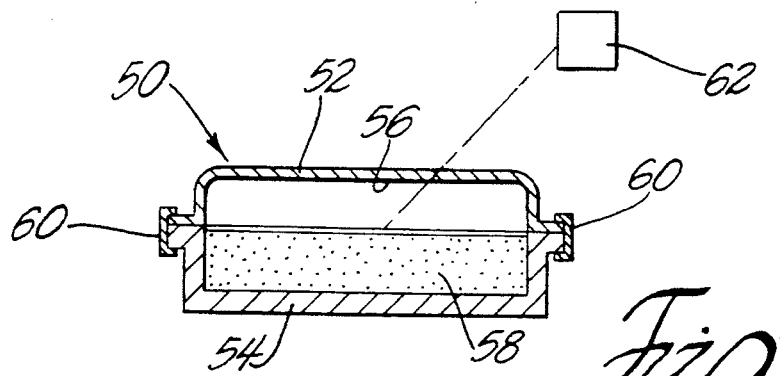
FIGS. 5 through 8 depict a diagrammatical representation of a mold suitable for practicing the method of the present invention.
Figure 6:
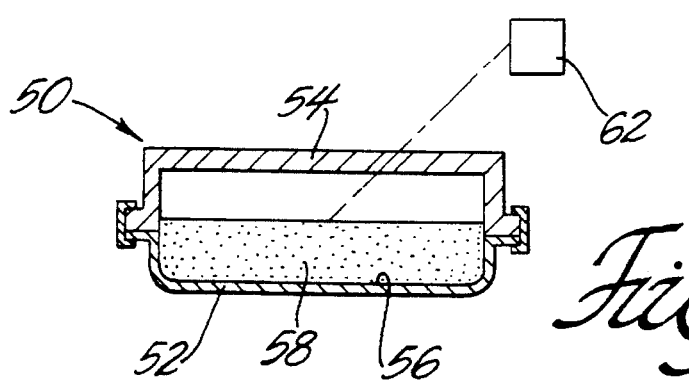

In conjunction with FIGS. 5 through 8, there will now be described a method for forming outer skin 14 with mesh 34 embedded therein. FIG. 5 shows a mold assembly 50 that includes a mold form 52 and a charge box 54. Mold 52 includes a surface 56 which is used to produce exterior surface 20 of outer skin 14. Mold surface 56 thus has a shape that corresponds to the desired geometry of the finished reinforcing preform. Mold surface 56 can be textured and otherwise engraved to provide exterior surface 20 with grain effects and other aesthetically pleasing detailing. Charge box 54 is partially filled with a charge of powdered thermoplastic material 58 out of which outer skin 14 is to be made. Thermoplastic material 58 can be a dry resin powder material with suitable coloring and plasticizer content, such as described in U.S. Pat. No. 4,923,657 issued May 8, 1990 to J. C. Gembinski et al.

Mold 52 mates with charge box 54 such that surface 56 of mold 52 is in open communication with the contents of charge box 54. Mold assembly 50 further includes a clamp or clamps 60 which secure and seal mold 52 to charge box 54 to prevent thermoplastic material 58 from escaping therebetween. When clamped together, mold 52 and charge box 54 form a sealed mold chamber.

Initially, mold form 52 is placed in an inverted position and clamped to charge box 54, as described above. Mold 52 is then heated to a sufficient temperature to cause approximately one millimeter of dry powder to attach and fuse. Mold assembly 50 is then rotated 180° to the position shown in FIG. 6 to thereby dump thermoplastic material 58 against surface 56. To effect this rotation, mold assembly 50 is rotatably supported by a suitable drive 62, such as that described in U.S. Pat. No. 4,664,864, issued May 12, 1987 to J. M. Wersosky, hereby incorporated by reference.

Figure 7:
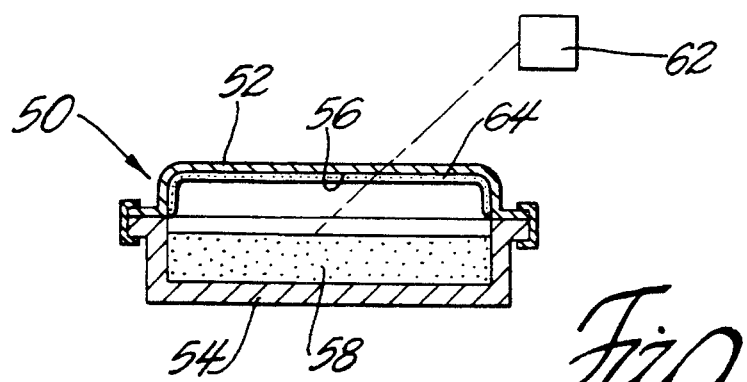

Since mold surface 56 has been heated, a layer 64 of material 58 attaches to surface 56 and fuses together. The remaining material 58 is dumped back into charge box 54 by rotating mold assembly 50 back to its initial position, as shown in FIG. 7. Mold form 52 and charge box 54 are then disconnected. While plastic layer 64 is still at an elevated temperature and is still in a substantially liquid state, woven mesh 34 is embedded into plastic layer 64 by pressing the mesh 34 into the exposed surface of layer 64. Preferably, this is done such that the plastic material of layer 64 extends into the interstices of mesh 34. If necessary, mold 52 can then be heated more to cure the thermoplastic material together. Finally, mold 52 is cooled to solidify layer 64 together which then comprises outer skin 14. U.S. Pat. No. 4,562,025, issued Dec. 31, 1985 to J. D. Gray, hereby incorporated by reference, provides more specific information on casting thermoplastic material.

If the outer skin formed by the above-described method is to include air bag door cover 32, then tear seam 22 can be added as an additional step and woven mesh 34 is placed on layer 64 such that it surrounds tear seam 22 (i.e., it forms gap 38 at tear seam 22). Tear seam 22 can be added to layer 64 in any manner. For example, tear seam 22 could be molded into layer 64 prior to embedding mesh 34 therein. Alternatively, tear seam 22 could be added after mesh 34 is embedded in layer 64. In a like manner, gap 38 can be formed in mesh 34 prior to embedment thereof, or, alternatively, by scoring mesh 34 after its attachment to layer 64. This latter means of forming gap 38 could be accomplished simultaneously with the formation of tear seam 22. That is, once formed, cover 32 could be scored in an operation that simultaneously separates mesh 34 to form gap 38 and scores layer 64 to form tear seam 22. Preferably, mesh 34 is spaced from tear seam 22 by approximately ¼ of an inch so that gap 38 is about ½ of an inch wide.

Figure 8:
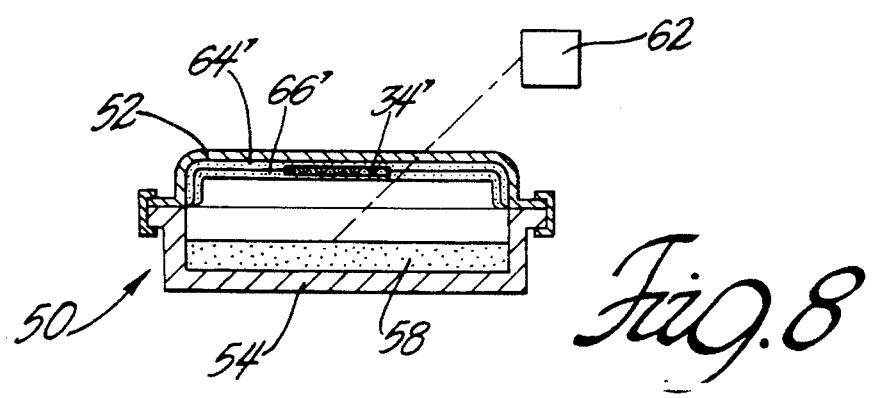

In accordance with another aspect of the present invention, outer skin 14' which includes cover 32' of FIG. 3A, can be formed by a modified version of the method described above. Initially, a layer 64' of thermoplastic material 58 is formed as described above in connection with FIGS. 5 through 7. Then, woven mesh 34' is placed on the exposed side of layer 64'. This can either be done by embedding mesh 34' into layer 64', as described above, or by allowing layer 64' to cool to a solid or semi-solid state and thereafter placing mesh 34' thereon. Mold 52 is then re-clamped to charge box 54 and mold assembly 50 is then inverted again to dump another charge of material 58 onto layer 64' and mesh 34'. A second layer 66' is thereby formed. Mold assembly is rotated once more to return it to its initial position, as shown in FIG. 8. Layers 64' and 66' are thereafter heated to completely fuse them into a single, unitary layer of plastic material that encases mesh 34'.

Rather than reattaching mold 52 to charge box 54 and dumping the material 58 onto layer 64', a plastic material in either dry or liquid form could be sprayed over mesh 34' to form a single layer of material that encases mesh 34'. More generally and as will be understood by those skilled in the art, outer skins 14 and 14' can be formed using other casting systems, such as a spray system. A slush process suitable for use in carrying out the method of the present invention is described in U.S. Pat. No. 4,623,503, issued Nov. 18, 1986 to E. Anestis et al.

It will thus be apparent that there has been provided in accordance with the present invention a reinforced outer skin for an automobile interior trim structure, as well as a method for making the same, which achieves the aims and advantages specified herein. It will of course be understood that the foregoing description is of preferred exemplary embodiments of the invention and that the invention is not limited to the specific embodiments shown. Various changes and modifications will become apparent to those skilled in the art. For example, instead of a woven mesh or other integral reinforcing sheet, individual fibers or reinforcing particles could instead be used to reinforce the outer skin. Such fibers or particles could, for example, be applied with a binder or could be forced into the layer of plastic material before it is allowed to solidify. Other variations will become apparent to those skilled in the art and all such variations and modifications are intended to come within the spirit and scope of the appended claims.

We claim:

1. An air bag door cover for use in air interior trim structure of an automobile, comprising:

an insert including hinged portions;

a foam layer connected to said hinged portions;

an outer skin of plastic material having a first surface defining an exposed decorative surface and a second surface opposing said first surface, said outer skin having a tear seam therein; and a reinforcing material extending along and embedded in said outer skin below said first surface and between said first surface and said foam layer, said reinforcing material extending on either side of tear seam.

2. A cover as set forth in claim 1 wherein said reinforcing material is spaced from said hinged portion.

3. A cover as set forth in claim 2 wherein said reinforcing material is wholly embedded within said outer skin between said first surface and said second surface.

4. A cover as set forth claim 2 wherein said reinforcing material is embedded in said second surface so that a portion protects in said outer skin and a portion projects in said foam layer.

* * * * *